US012655236B2

(12) United States Patent
Dewson et al.

(10) Patent No.: US 12,655,236 B2
(45) Date of Patent: Jun. 16, 2026

(54) POST CONSUMER RESIN PACKAGING

(71) Applicant: Conopco, Inc., Englewood Cliffs, NJ (US)

(72) Inventors: Lee Dewson, Wirral (GB); Yuvesveri Naidoo, Wirral (GB)

(73) Assignee: CONOPCO, INC., Englewood Cliffs, NJ (US)

( * ) Notice: Subject to any disclaimer, the term of this patent is extended or adjusted under 35 U.S.C. 154(b) by 0 days.

(21) Appl. No.: 17/793,561

(22) PCT Filed: Jan. 22, 2021

(86) PCT No.: PCT/EP2021/051480

§ 371 (c)(1),
(2) Date: Jul. 18, 2022

(87) PCT Pub. No.: WO2021/151797

PCT Pub. Date: Aug. 5, 2021

(65) Prior Publication Data

US 2023/0060286 A1     Mar. 2, 2023

(30) Foreign Application Priority Data

Jan. 30, 2020     (EP) ..................................... 20154461

(51) Int. Cl.

| | |
|---|---|
| *C08F 110/02* | (2006.01) |
| *B32B 27/08* | (2006.01) |
| *B32B 27/32* | (2006.01) |
| *B65D 1/02* | (2006.01) |
| *C08L 23/06* | (2006.01) |

(52) U.S. Cl.
CPC ............ *C08F 110/02* (2013.01); *B32B 27/08* (2013.01); *B32B 27/32* (2013.01); *B65D 1/0215* (2013.01); *C08L 23/06* (2013.01); *B32B 2250/24* (2013.01); *B32B 2270/00* (2013.01); *B32B 2272/00* (2013.01); *B32B 2307/4026* (2013.01); *B32B 2439/60* (2013.01); *B32B 2439/70* (2013.01); *C08F 2500/07* (2013.01); *C08L 2207/20* (2013.01)

(58) Field of Classification Search
CPC ..... B32B 1/02; B32B 27/32; B32B 428/1352; B32B 428/31855; Y10T 428/1352; Y10T 428/31855; F16L 11/04
USPC ................................................ 428/35.7, 516
See application file for complete search history.

(56) References Cited

U.S. PATENT DOCUMENTS

| | | | |
|---|---|---|---|
| 5,552,198 A | 9/1996 | Hiltner et al. | |
| 5,712,009 A * | 1/1998 | Moore .................... | B32B 27/32 |
| | | | 206/524.1 |
| 5,908,677 A * | 6/1999 | Hiltner ...................... | B32B 1/00 |
| | | | 525/240 |
| 2008/0233413 A1 | 9/2008 | Hostetter et al. | |
| 2010/0190897 A1 | 7/2010 | Maletzko et al. | |
| 2014/0106152 A1 | 4/2014 | Abhyankar et al. | |
| 2014/0319013 A1* | 10/2014 | Wang ....................... | C08J 3/226 |
| | | | 206/524.6 |

FOREIGN PATENT DOCUMENTS

| | | |
|---|---|---|
| CN | 101688024 A | 3/2010 |
| CN | 103608402 A | 2/2014 |
| EP | 0654496 A2 | 5/1995 |
| EP | 2668105 B1 | 12/2013 |
| EP | 3050912 A1 | 8/2016 |
| GB | 253494 A | 9/1926 |
| GB | 2572796 A | 10/2019 |
| JP | H07195560 A | 8/1995 |
| WO | 2012102778 A1 | 8/2012 |

OTHER PUBLICATIONS

The Free Dictionary, https://en.thefreedictionary.com/bilayer, 2003-2025.*
Extended European Search Report on European Patent Application No. 20154461.6 dated Jun. 19, 2020 (7 pages).
International Search Report and Written Opinion on International Patent Application No. PCT/EP2021/051480 dated Apr. 6, 2021 (11 pages).
International Preliminary Report on Patentability on International Patent Application No. PCT/EP2021/051480 dated Feb. 28, 2022 (10 pages).

* cited by examiner

*Primary Examiner* — Michael C Miggins
(74) *Attorney, Agent, or Firm* — Carter, DeLuca & Farrell, LLP; George Likourezos; Bret P. Shapiro

(57) ABSTRACT

The present invention relates to a sustainable article for packaging which could be made substantially free of virgin petroleum-based compounds; in particular it relates to new packaging made from coloured post-consumer resin (PCR) having a high NIR absorption. A need remains to create a circular economy for coloured and/or black plastic by bringing the waste coloured and black plastic into new packaging while using Near infrared (NIR) detectable pigment in the colourant masterbatch. It is therefore an object of the present invention to bring the coloured or black plastic waste into new packaging. It has be found that a sustainable packaging in consumer acceptable black using NIR detectable pigment can be obtained by using a multilayer post-consumer resin, comprising a thinner outer layer of post-consumer resin of natural plastic waste (N-PCR); and a thicker inner layer comprising at least 50% coloured plastic waste (J-PCR).

17 Claims, No Drawings

POST CONSUMER RESIN PACKAGING

CROSS REFERENCE TO RELATED APPLICATIONS

The present application is a U.S. National Phase Application under 35 U.S.C. § 371 of International Application No. PCT/EP2021/051480, filed on Jan. 22, 2021, which claims priority to European patent application No. 20154461.6, filed on Jan. 30, 2020, the complete contents of which are incorporated herein by reference in their entireties.

FIELD OF THE INVENTION

The present invention relates to a sustainable article for packaging which could be made substantially free of virgin petroleum-based compounds; in particular it relates to new packaging made from coloured post-consumer resin (PCR) having a high NIR absorption.

BACKGROUND OF THE INVENTION

Across the world, plastic has become an integral part of people's lives, but with it has also emerged the growing problem of its waste. Plastics are useful and versatile materials of low cost and are convenient to use. It is not the use of plastic that is the problem but the single use of it is. By a single use of plastic, 95% of its value is lost.

However, recent years have witnessed a substantial effort to recycle plastic. Plastic that has been collected via established consumer recycling streams, sorted, washed and reprocessed into pellets is defined as post-consumer resin (PCR). This can be used instead of virgin resin to create new plastic packaging for consumer goods.

Plastic recycle efforts are becoming larger in scale enabling a classification in grades. Broadly defined, there are food grade and non-food grade PCR materials.

Non-food grade PCR is generally classified into 4 types: recycled high-density polyethylene (HDPE), recycled polypropylene (PP), recycled low density polyethylene (LDPE) and recycled polyethylene terephthalate (PET).

Recycled HDPE are of three grades: Natural PCR (transparent) obtained from milk or dairy waste bottles, off white PCR (opaque) obtained from white and/or light-coloured bottles and grey PCR (light or dark) obtained from mixed coloured bottles.

While the natural and the off-white grade can easily be used in making new packaging either as white or coloured bottles or containers, the same is not the case with grey PCR because of its grey colour. It was thought that the grey pellets can be used in making dark coloured packaging materials such as black or shades of black. However, when it was attempted to colour the grey PCR with a near infrared (NIR) spectroscopy detectable black pigment, it was observed that the colour obtained was not really black and there was a substantial difference in the colour when compared to the black colour of virgin plastic coloured with the same detectable black pigment, thus making the recycled bottles unsuitable for sale; at least for sale of premium products.

A possible alternative may be to use carbon black as pigment. However, plastic or PCR coloured with carbon black cannot be detected by automatic near infrared (NIR) sorting systems which are used predominantly in material recovery facilities (MRFs), plastics recovery facilities (PRFs) and at reprocessors to separate plastics into different polymer streams for reprocessing into PCR. Therefore, carbon black coloured plastic typically ends up in the unsorted residue, which is less suitable for reprocessing, and is generally treated as waste.

EP 0 654 496 A2 discloses plastic containers made of post-consumer resin, in particular to lightweight plastic containers which has stress crack resistance and comprises at least one layer comprising post-consumer plastic film resin; a fusion blend of post-consumer plastic film resin and post-consumer plastic milk resin; or a fusion blend of post-consumer plastic film resin, post-consumer plastic milk resin and virgin high density ethylene copolymer plastic material.

A need therefore remains to create a circular economy for coloured and/or black plastic by bringing the waste coloured and black plastic into new packaging while using Near infrared (NIR) detectable pigment in the colourant masterbatch.

Therefore, it is an object of the present invention to bring the coloured or black plastic waste into new packaging.

It is another object of the present invention to provide a sustainable article for packaging which could be made substantially free of virgin petroleum-based compounds.

It is yet another object of the present invention to provide a sustainable article made of coloured or black plastic waste while using a Near infrared (NIR) detectable pigment as the colourant masterbatch.

It is yet another object of the present invention to provide a black coloured article with more than 95% PCR.

It is yet another object of the present invention to provide a black coloured article with more than 95% PCR and having reduced odour.

It is a further object of the invention to provide such a sustainable packaging in consumer acceptable black.

Surprisingly it has be found that a sustainable packaging in consumer acceptable black using NIR detectable pigment can be obtained by using a multilayer post-consumer resin, comprising a thinner outer layer of post-consumer resin of natural plastic waste (N-PCR); and a thicker inner layer comprising at least 50% coloured plastic waste (J-PCR).

SUMMARY OF THE INVENTION

Accordingly, in a first aspect, the present invention provides a sustainable article for packaging comprising a multilayer post-consumer resin (PCR) wherein the multilayer comprises: an outer layer comprising post-consumer resin of natural plastic waste (N-PCR); and an inner layer comprising post-consumer resin of natural plastic waste (N-PCR) or coloured plastic waste (J-PCR) wherein at least 50% of the inner layer comprises post-consumer resin of coloured plastic waste (J-PCR), wherein the outer and/or inner layer comprises a NIR detectable colourant masterbatch.

In a second aspect, the present invention provides use of the article according to any invention for packaging fast moving consumer goods (FMCG).

In the context of the present invention, the reference to "post-consumer resin (PCR)" typically means plastic that has been collected via established consumer recycling streams, sorted, washed and reprocessed into pellets.

In the context of the present invention, the reference to "sustainable" typically means a material having an improvement of greater than 10% in some aspect of its Life Cycle Assessment or Life Cycle Inventory, when compared to the relevant virgin petroleum-based plastic material that would otherwise have been used to manufacture the article. As used herein, "Life Cycle Assessment" (LCA) or "Life Cycle Inventory" (LCI) refers to the investigation and evaluation of the environmental impacts of a given product or service caused or necessitated by its existence. The LCA or LCI can involve a "cradle-to-grave" analysis, which refers to the full Life Cycle Assessment or Life Cycle Inventory from manufacture ("cradle") to use phase and disposal phase ("grave"). For example, high density polyethylene (HDPE) containers can be recycled into HDPE resin pellets, and then used to form containers, films, or injection molded articles, for example, saving a significant amount of fossil-fuel energy. At the end of its life, the polyethylene can be disposed of by incineration, for example. All inputs and outputs are considered for all the phases of the life cycle.

These and other aspects, features and advantages will become apparent to those of ordinary skill in the art from a reading of the following detailed description and the appended claims. For the avoidance of doubt, any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the operating and comparative examples, or where otherwise explicitly indicated, all numbers in this description indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

DETAILED DESCRIPTION OF THE INVENTION

In a first aspect, the present invention relates to a sustainable article for packaging. The sustainable article of the present invention is made from post-consumer resin (PCR) and preferably is substantially free of virgin plastic.

By "substantially free" it is meant that the article comprises less than 5 wt %, preferably less than 3 wt %, more preferably less than 2 wt %, even more preferably less than 1 wt % or even 0 wt % of virgin plastic.

The PCR used in the present invention is recycled polyethylene, preferably recycled high-density polyethylene (HDPE).

Preferably, the article of the present invention comprises a multilayer post-consumer resin (PCR).

The multilayer comprises at least two layers: an outer layer and an inner layer.

The outer layer is typically the layer that is on the outside of the article, usually, directly visible to the consumer.

The outer layer of the multilayer comprises post-consumer resin of natural plastic waste (N-PCR). Natural plastic waste typically comes from waste milk or diary bottles or the similar.

The inner layer of the multilayer comprises post-consumer resin of natural plastic waste (N-PCR) or coloured plastic waste (J-PCR). Preferably, at least 50% of the inner layer comprises post-consumer resin of coloured plastic waste (J-PCR). Preferably, the inner layer comprises at least 60%, more preferably at least 70%, even more preferably at least 80%, still more preferably at least 90% or even 100% of coloured plastic waste (J-PCR).

Coloured plastic waste typically comes from waste coloured and/or mixed consumer bottles. Post-consumer resin of coloured plastic waste is commonly referred to as Jazz PCR (J-PCR).

Both N-PCR and J-PCR are available in the market from various suppliers such as Viridor, QCP and Biffa in Europe and KW plastics in North America.

When present as a bilayer, the weight ratio of the outer layer to inner layer is typically from 99:1 to 1:99, but preferably from 1:1, more preferably from 3:7 or even from 1:3, while preferably to 1:20, more preferably to 1:10 or even to 1:5

The multilayer of the present invention may further comprise a second inner layer, which when present will become the innermost layer which typically will be the layer in contact with the product.

When present, the second inner layer comprises post-consumer resin of natural plastic waste (N-PCR).

While the use of the outer layer of N-PCR is predominantly intended to provide a more intense colour on the outside of the article, the provision of the second inner layer (or innermost layer) of N-PCR in multi-layer articles reduces the malodour that often comes from J-PCR.

When present as a trilayer, the weight ratio of the outer layer to inner layer to second inner layer is from 1:1.5:1 to 1:98:1, but preferably from 1:2:1, more preferably from 1:3:1 while preferably to 1:18:1, more preferably to 1:10:1 or even to 1:8:1 or even to 1:5:1

Preferably the outer and/or inner layer comprises a colourant masterbatch. More preferably, the outer layer comprises a colourant masterbatch. By "colourant masterbatch" it is a meant a mixture in which pigments are dispersed at high concentration in a carrier material. The colorant masterbatch is used to impart colour to the article.

The carrier may be a biobased plastic or a petroleum-based plastic, or a biobased oil or a petroleum-based oil or made of post-consumer resin (PCR).

Nonlimiting examples of the carrier include bio-derived or oil derived polyethylene (e.g, LLDPE, LDPE, HDPE), bio-derived oil (e.g., olive oil, rapeseed oil, peanut oil), petroleum-derived oil, recycled oil, bio-derived or petroleum derived polyethylene terephthalate, polypropylene, recycled high density polyethylene (rHDPE), recycled low density polyethylene (rLDPE). Preferably the carrier is recycled high density polyethylene (rHDPE) or recycled low density polyethylene (rLDPE).

When it is desired that all the layers are made of 100% of PCR, the carrier is also preferably selected from PCR. Similarly, when it is desired that a layer has a 100% of a specific PCR, the carrier is preferably selected from the same PCR.

The pigment, when present, of the masterbatch is a NIR detectable pigment. Carbon black is not preferred in the scope of the present invention. The NIR detectable pigment is preferably black. The pigment is typically made of a combination of known colours.

By consumer acceptable black, it may be defined as the colour measured using a reflectometer and expressed as the CIE L*a*b* values and the values of L being less than 25, preferably less than 23, more preferably less than 20, even more preferably less than 15, still more preferably less than 12 or even less than 10, the values of a being in the ranges of −5 to 5, preferably −2 to 3, more preferably 0 to 2 and the values of b being in the ranges of −10 and 10, preferably −8 to 5.

By NIR detectable pigment is meant detectable by Near infrared (NIR) spectroscopy.

The pigment of the carrier may include, for example, an inorganic pigment, an organic pigment, a polymeric resin, or a mixture thereof.

Optionally, the colourant masterbatch can further include one or more additives. Nonlimiting examples of additives include slip agents, UV absorbers, nucleating agents, UV stabilizers, heat stabilizers, clarifying agents, fillers, brighteners, process aids, perfumes, flavors, and a mixture thereof.

Such NIR detectable pigments are known in the art and are provided by various suppliers such as Clariant, globally and Colourtone Masterbatch Ltd. in Europe.

The article according to the invention is preferably a container; in particular the article according to the invention is a non-food grade container.

Method

The article of the invention can be produced using blow molding. Blow molding is a manufacturing process by which hollow plastic parts are formed from thermoplastic materials. The blow molding process begins with melting down thermoplastic and forming it into a parison or preform. The parison is a tube-like piece of plastic with a hole in one end through which compressed air can pass. Pressurized gas, usually air, is used to expand the parison or the hot preform and press it against a mold cavity. The pressure is held until the plastic cools. After the plastic has cooled and hardened the mold opens up and the part is ejected.

There are three main types of blow molding: extrusion blow molding, injection blow molding, and injection stretch blow molding. In extrusion blow molding, a molten tube of plastic is extruded into a mold cavity and inflated with compressed air. One end of the cylinder is pinched closed. After the plastic part has cooled, it is removed from the mold. Extrusion blow molding can be used to produce the multilayer articles of the invention.

Use

In a further aspect the invention provides the use of the article according to the invention for packaging fast moving consumer goods (FMCG), such as personal care products, beauty products, cosmetic products, home care products and/or food products.

EXAMPLES

Example 1

In this Example, a bottle having both inner and outer layer made of J-PCR (Comp A) and coloured with 1% of the 80% layer with Colourtone F95884 and 4% of the outer layer with Colourtone F95884 is compared with a bottle having layers according to the invention and coloured with 1% of the 80% layer with Colourtone F95884 and 4% of the outer layer with Colourtone F95884 (Ex 1).

| | Weight ratio of outer to inner layer | Outer layer material | Wt % | Inner layer material | Wt % |
|---|---|---|---|---|---|
| Comp A | 20:80 | J-PCR | 20 | J-PCR | 80 |
| Ex 1 | 20:80 | N-PCR | 20 | J-PCR + N-PCR | 40 + 40 |
| Control | 20:80 | Virgin HDPE | 20 | Virgin HDPE | 80 |

| | Pantone colour code | L value | a value | b value |
|---|---|---|---|---|
| Comp A | Pantone 432c | 25.68 | −2.8 | −7.33 |
| Ex 1 | Pantone 532c | 11.95 | 1.26 | −7.71 |
| Control | Pantone 2c | 19.37 | 0.31 | 9.78 |

The resultant colour of the bottle of Comp A was greyer in colour even though it was coloured with a black coloured masterbatch (Colourtone F95884). The consumer acceptable black that is desired is obtained in the control bottle which uses virgin HDPE for both layers. This colour is matched by the colour of the bottle having layers according to the invention (Ex 1) but not Comp A.

Example 2

In this Example, trilayer bottle having all layers made of J-PCR (Comp B) and coloured with 3% of the 60% middle layer (inner layer) with Clariant PE94000797 and 3% of the 20% outer layer with Clariant PE94000804 are compared to bottles having layers according to the invention and coloured with 3% of the 60% middle layer (inner layer) with Clariant PE94000797 and 3% of the 20% outer layer with Clariant PE94000804 (Ex 2 and Ex 3).

| | Weight ratio of outer to inner layer | Outer layer material | Wt % | Inner layer material | Wt % | Second inner layer | Wt % |
|---|---|---|---|---|---|---|---|
| Comp B | 20:60:20 | J-PCR | 20 | J-PCR | 60 | J-PCR | 20 |
| Ex 2 | 20:60:20 | N-PCR | 20 | J-PCR | 60 | N-PCR | 20 |
| Ex 3 | 20:60:20 | N-PCR | 20 | J-PCR + N-PCR | 30 + 30 | N-PCR | 20 |

The resultant colour of the bottle of Comp B was greyer in colour even though it was coloured with a black coloured masterbatch (middle layer (inner layer) Clariant PE94000797 and outer layer Clariant PE94000804). The consumer acceptable black that is desired was obtained in the bottles of Ex 2 and Ex 3 having layers according to the invention but not Comp B.

The invention claimed is:

1. A sustainable bilayer post-consumer resin (PCR) article for packaging comprising:

an outside layer on the outside of the bilayer post-consumer resin (PCR) article, the outside layer comprising post-consumer resin of natural plastic waste (N-PCR), wherein the natural plastic waste is from milk or dairy waste bottles; and an inner layer inside of the outside layer and in contact with product within the bilayer post-consumer resin (PCR) article, the inner layer comprising post-consumer resin of natural plastic waste (N-PCR) or coloured plastic waste (J-PCR) wherein the coloured plastic waste (J-PCR) is from mixed coloured bottles and at least 50 wt. % of the inner layer comprises post-consumer resin of coloured plastic waste (J-PCR), wherein the outside and/or inner layer of the bilayer post-consumer resin (PCR) article for packaging comprises a near infrared (NIR) detectable colourant masterbatch and wherein the article comprises less than 5 wt. % of virgin plastic.

2. The article according to claim 1, wherein the inner layer comprises 100 wt. % of post-consumer resin of coloured plastic waste (J-PCR).

3. The article according to claim 1, wherein the weight ratio of the outside layer to the inner layer is 1:4.

4. The article according to claim 1, wherein the inner layer is a second inner layer, and a first inner layer is added inside of the second inner layer of the bilayer post-consumer resin (PCR) article to produce a trilayer post-consumer resin (PCR) article and the first inner layer comprises post-consumer resin of natural plastic waste (N-PCR) or coloured plastic waste (J-PCR) wherein the coloured plastic waste (J-PCR) is from mixed coloured bottles and at least 50 wt. % of the first inner layer comprises post-consumer resin of coloured plastic waste (J-PCR).

5. The article according to claim 1, wherein the NIR detectable colourant masterbatch is black.

6. The article according to claim 1, wherein the post-consumer resin of natural plastic waste (N-PCR) and the post-consumer resin of coloured plastic waste (J-PCR) is waste high-density polyethylene (HDPE).

7. The article according to claim 1, wherein the article comprises less than 3% of virgin plastic.

8. The article according to claim 1, wherein the article is a container.

9. The article according to claim 1, wherein the article is a non-food grade article.

10. The article according to claim 1, wherein the article comprises packaging for fast moving consumer goods (FMCG).

11. A sustainable bilayer non-food grade article for packaging comprising:

an outside layer on the outside of the bilayer non-food grade article, the outside layer comprising post-consumer resin of natural plastic waste (N-PCR), wherein the natural plastic waste is from milk or dairy waste bottles; and

an inner layer inside of the outside layer and in contact with product within the bilayer non-food grade article, the inner layer comprising post-consumer resin of natural plastic waste (N-PCR) or coloured plastic waste (J-PCR) wherein the coloured plastic waste (J-PCR) is from mixed coloured bottles and at least 50 wt. % of the inner layer comprises post-consumer resin of coloured plastic waste (J-PCR), wherein the outside and/or inner layer of the bilayer non-food grade article for packaging comprises a near infrared (NIR) detectable colourant masterbatch; and wherein the article comprises less than 5% of virgin plastic.

12. The article according to claim 11, wherein the inner layer comprises 100 wt. % of post-consumer resin of coloured plastic waste (J-PCR).

13. The article according to claim 11, wherein the weight ratio of the outside layer to the inner layer is 1:4.

14. The article according to claim 11, wherein the inner layer is a second inner layer, and a first inner layer is added inside of the second inner layer of the bilayer non-food grade article to produce a trilayer non-food grade article and the first inner layer comprises post-consumer resin of natural plastic waste (N-PCR) or coloured plastic waste (J-PCR) wherein the coloured plastic waste (J-PCR) is from mixed coloured bottles and at least 50 wt. % of the first inner layer comprises post-consumer resin of coloured plastic waste (J-PCR).

15. The article according to claim 11, wherein the NIR detectable colourant masterbatch is black.

16. The article according to claim 11, wherein the post-consumer resin of natural plastic waste (N-PCR) and the post-consumer resin of coloured plastic waste (J-PCR) is waste high-density polyethylene (HDPE).

17. The article according to claim 11, wherein the article comprises packaging for fast moving consumer goods (FMCG).

* * * * *